(12) United States Patent
Young et al.

(10) Patent No.: US 7,450,512 B1
(45) Date of Patent: Nov. 11, 2008

(54) RECIRCULATING RETRANSMISSION QUEUING SYSTEM AND METHOD

(75) Inventors: Charles David Young, Plano, TX (US); Brad A. Parke, Carrollton, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 987 days.

(21) Appl. No.: 10/629,287

(22) Filed: Jul. 29, 2003

(51) Int. Cl.
    *G01R 31/06* (2006.01)
(52) U.S. Cl. .................. 370/235; 370/412; 714/748
(58) Field of Classification Search .................. 370/389
    See application file for complete search history.

(56) References Cited

U.S. PATENT DOCUMENTS

| 6,504,829 | B1 | 1/2003 | Young et al. ................. 370/337 |
| 6,515,973 | B1 | 2/2003 | Young ........................ 370/329 |
| 6,574,199 | B1 | 6/2003 | Young et al. ................. 370/254 |
| 6,574,206 | B2 | 6/2003 | Young ........................ 370/337 |
| 7,016,304 | B2 * | 3/2006 | Chou et al. ................. 370/235 |
| 7,145,869 | B1 * | 12/2006 | Kadambi et al. ............ 370/229 |
| 2002/0089994 | A1 * | 7/2002 | Leach et al. ................. 370/412 |
| 2002/0114292 | A1 * | 8/2002 | Kawabata et al. ........... 370/329 |

\* cited by examiner

*Primary Examiner*—Seema S Rao
*Assistant Examiner*—Sai-Ming Chan
(74) *Attorney, Agent, or Firm*—Nathan O. Jensen (57) ABSTRACT

A method of retransmitting a data cell is disclosed. The method comprises providing a transmit queue having a head and a tail and providing a retransmit queue having a head and a tail. The method also comprises transmitting a first data cell from the head of the transmit queue. The method further comprises inserting the first data cell at the tail of the retransmit queue and retransmitting a second data cell at the head of the retransmit queue.

20 Claims, 5 Drawing Sheets

RECIRCULATING RETRANSMISSION QUEUING SYSTEM AND METHOD

BACKGROUND

Figure 1:
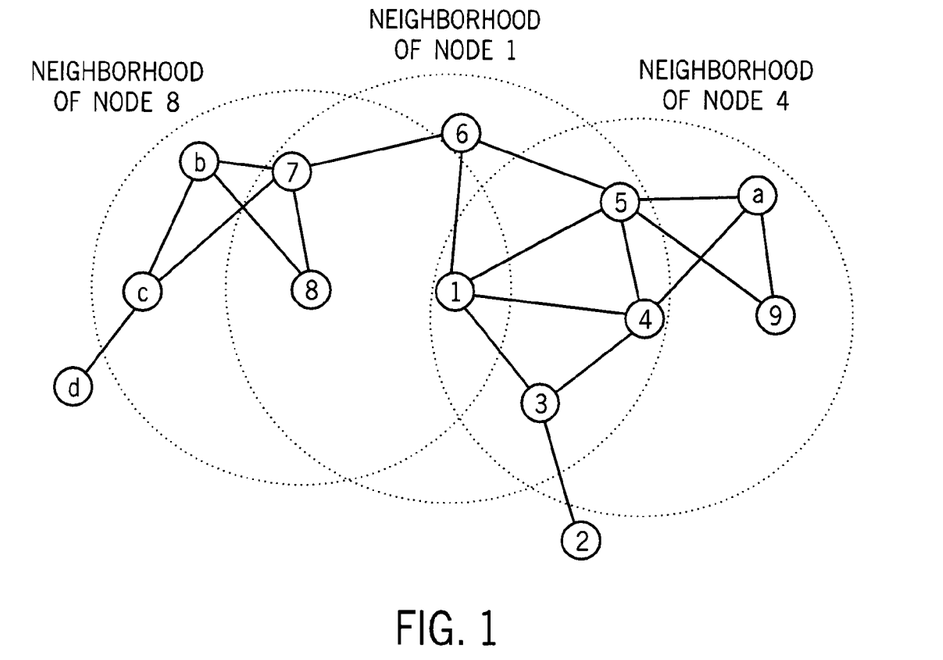
FIG. 1 is an exemplary depiction of an ad-hoc radio node network.

Mobile multi-hop broadcast packet radio networks are known for their rapid and convenient deployment, self organization, mobility, and survivability. In this type of network as illustrated in FIG. 1, a transmission from one node, for example node 1, is broadcast to all nodes in its "neighborhood". Ultra-high frequency (UHF) systems generally have a neighborhood defined by nodes within line of sight of the transmitting node (these nodes being termed within one "hop" of the transmitting node). For example, in FIG. 1 nodes 1, 3, 4, 5, 6, 7, and 8 make up one neighborhood. For data transmitted from node 1 to propagate multiple hops, the data must be relayed by one or more of node 1's neighbors. For example, node "a" (likewise nodes b, c, and g) is two hops away from the node 1 transmitter. The data will be relayed in this manner until it has arrived at all intended destination nodes.

Since there are generally limitations on the number of simultaneous transmissions that a receiver can successfully process (typically one), collisions can be avoided by the assignment of time slots in which individual nodes can transmit. There are many approaches to deciding which nodes are assigned which slots, and the approach is generally driven by the network applications, such as, broadcast, multicast, unicast, datagrams, virtual circuits, etc. Because the problem of optimally assigning slots in this environment is mathematically intractable, a heuristic approach is taken to design an integrated protocol that both chooses the number of slots to assign to each neighboring node and coordinates their activation in the network.

Tactical military and commercial applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers. This functionality is provided by the Unifying Slot Assignment Protocol (USAP) which is the subject of U.S. Pat. No. 5,719,868, the disclosure of which is herein incorporated by reference. The function of USAP is to monitor the RF environment and allocate the channel resources on demand and automatically detect and resolve contention resulting from changes in connectivity.

It is therefore desirable for a wireless ad-hoc radio node network system to use a retransmission system, with desired efficiencies for retransmissions. Accordingly, there is a need for a recirculation retransmission queue which avoids linear searching of a retransmission queue for data cells which may be available for retransmission.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One example of the invention relates to a method of retransmitting a data cell. The method comprises providing a transmit queue having a head and a tail and providing a retransmit queue having a head and a tail. The method also comprises transmitting a first data cell from the head of the transmit queue. The method further comprises inserting the first data cell at the tail of the retransmit queue and retransmitting a second data cell at the head of the retransmit queue.

Another example of the invention relates to a communications system having a transmission reliability subsystem. The reliability subsystem comprises a means for providing a transmit queue having a head and a tail and a means for providing a retransmit queue having a head and a tail. The reliability subsystem also comprises a means for transmitting a first data cell from the head of the transmit queue. The reliability subsystem further comprises a means for inserting the first data cell at the tail of the retransmit queue and a means for retransmitting a second data cell at the head of the retransmit queue.

Yet another example of the invention relates to a communications system. The communications system comprises a plurality of transceiver nodes configured to utilize a time division multiple access structure to communicate between the transceiver nodes and the time division multiple access structure including a plurality of time slots during which the transceiver nodes are configured to communicate data cells, the data cells being transmitted from a transmission queue and a retransmission queue. The cells transmitted from the transmission queue are selectively placed sequentially into the retransmission queue for later retransmission.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

A wireless networking engine (WNE) may be used for management purposes in an ad-hoc radio node network. The WNE is unique in its ability to manage dynamic, distributed, mobile radio networks. An internet protocol (IP) Quality of Service (QoS) mechanism adds significant new capabilities to deal with user data requirements in support of multimedia applications.

Figure 2:
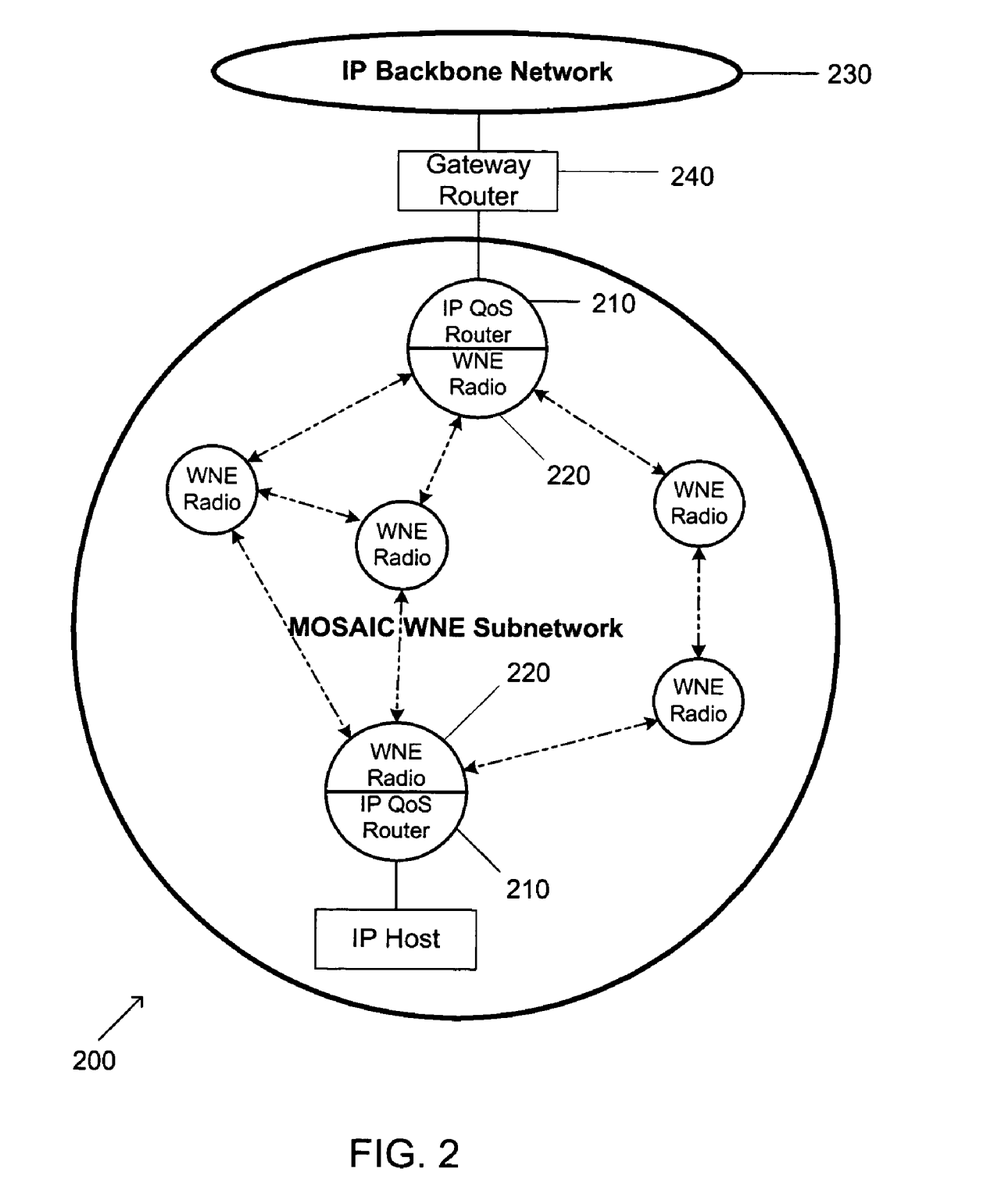
FIG. 2 is an exemplary depiction of an IP network and the WNE subnet.

According to an exemplary embodiment, an IP QoS Router 210 may be integrated with any WNE subnet radio node 220, which may connect with an IP backbone 230 via a Gateway Router 240. WNE radio network 200 plays a link layer function for transmitting IP packets between the routers 210, as depicted in FIG. 2.

Figure 3:
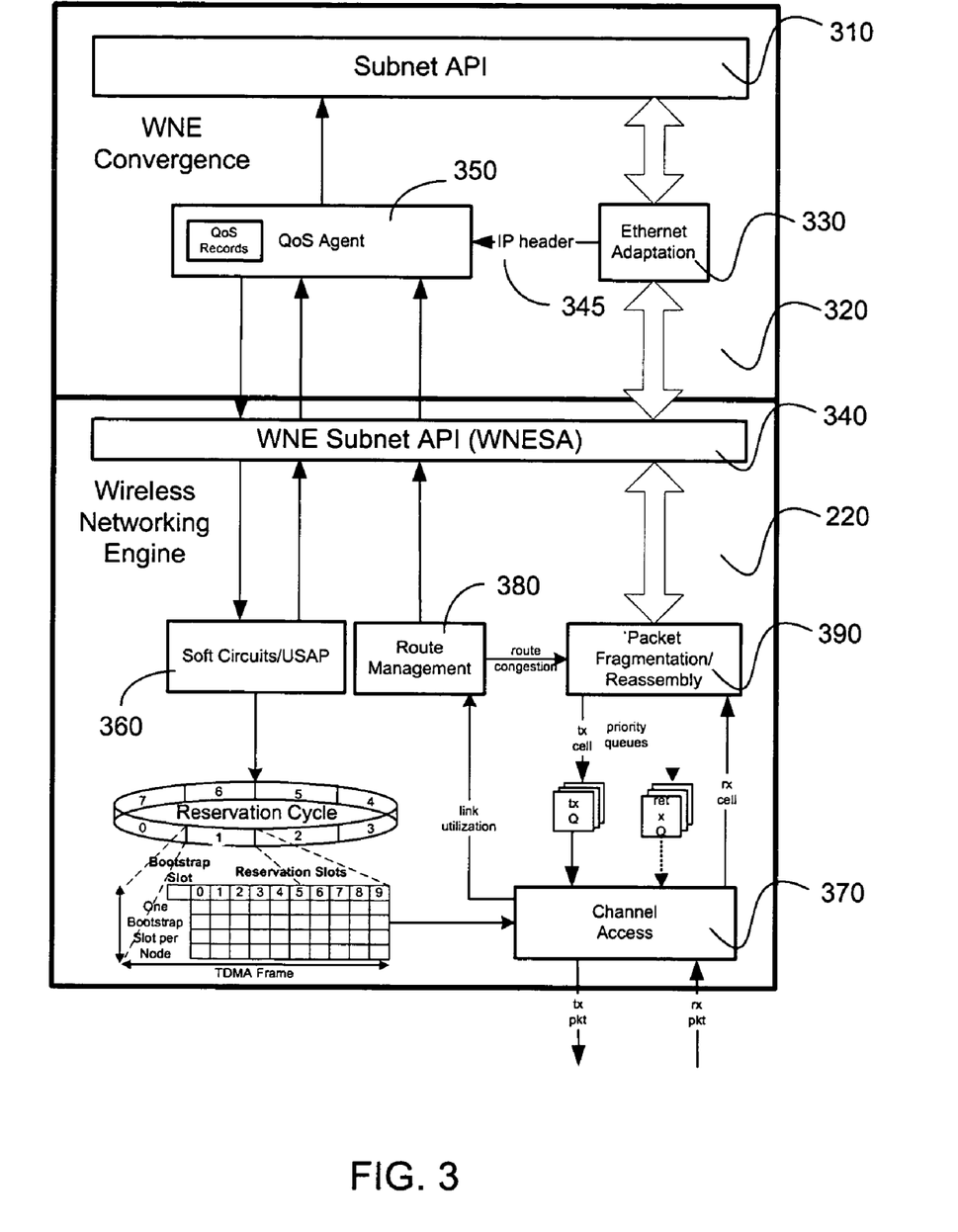
FIG. 3 is an exemplary depiction of the WNE subnet QoS processing system.

Referring to exemplary FIG. 3, IP QoS router 210 passes packets over the Subnet API 310 for QoS processing by a WNE Convergence 320. In an exemplary role as a transparent Ethernet bridge, WNE Convergence 320 examines all Ethernet packets entering and leaving the subnet 200. A driver herein called Ethernet Adaptation 330 intercepts the IP packets and passes them over the WNE Subnet API (WNESA) 340 for transmission. In the process it passes copies of the IP headers 345 to a QoS Agent 350, which handles circuit reservations based on the Differentiated Services (DiffServ) code point and bandwidth information. In particular, QoS Agent 350 performs the following functions:

- Translates code points and bandwidth specs to internal bandwidth, priority, latency, and reliability parameters.
- Manages reservation requests to the Unifying Slot Assignment protocol (USAP) 360 within WNE 220 in response to the bandwidth and latency specifications.
- Issues flow control commands to the subnet interface in response to end-to-end congestion reports coming from WNE 220.

When it receives an IP header from the Ethernet Adaptation 330, QoS Agent 350 checks it for IP QoS compliance. If compliant, it contains a DiffServ code point that will get translated into WNE services.

QoS Agent 350 may be used to try to find the reservation in a QoS Record. If the reservation is not found, it stores the information into the QoS Record. Then it translates this to the WNE subnet QoS parameters and sends the reservation request over WNESA 340. The request includes the latency, priority, and bandwidth information. Since there can be numerous QoS flows passing through WNE 220, QoS Agent 350 increases efficiency by aggregating flows with the same code point and destination to a single Soft Circuit 360 reservation. The reservation response causes QoS Agent 350 to update the QoS Record to indicate success or failure.

A timer monitors the QoS Records. Whenever it expires, if there have been any new packets that arrive for a particular reservation, QoS Agent 350 sends a reservation request to keep it alive. Otherwise, it removes the QoS Record and the Soft Circuit dismantles itself.

To support flow control, QoS Agent 350 processes congestion reports from the WNE subnet. If the congestion is pertinent to one or more code points in its QoS Records, the QoS Agent forwards the information to Subnet API 310.

Still referring to FIG. 3, WNE QoS processing impacts numerous task modules:

- Dynamic TDMA slot assignments by USAP 360 set up virtual circuits in response to the bandwidth requests coming from QoS Agent 350. Soft Circuits 360 maintain the slot assignments in the face of changing network topologies and accommodates traffic with low latency requirements.
- Hop-by-hop acknowledgements and retransmissions along with enhanced destination reassembly buffering support traffic with increased reliability requirements.
- End-to-end congestion reports identify paths to nodes that are congested. The packet fragmentation takes advantage of route congestion metrics to exert flow control on packets entering the source node.

Figure 4:
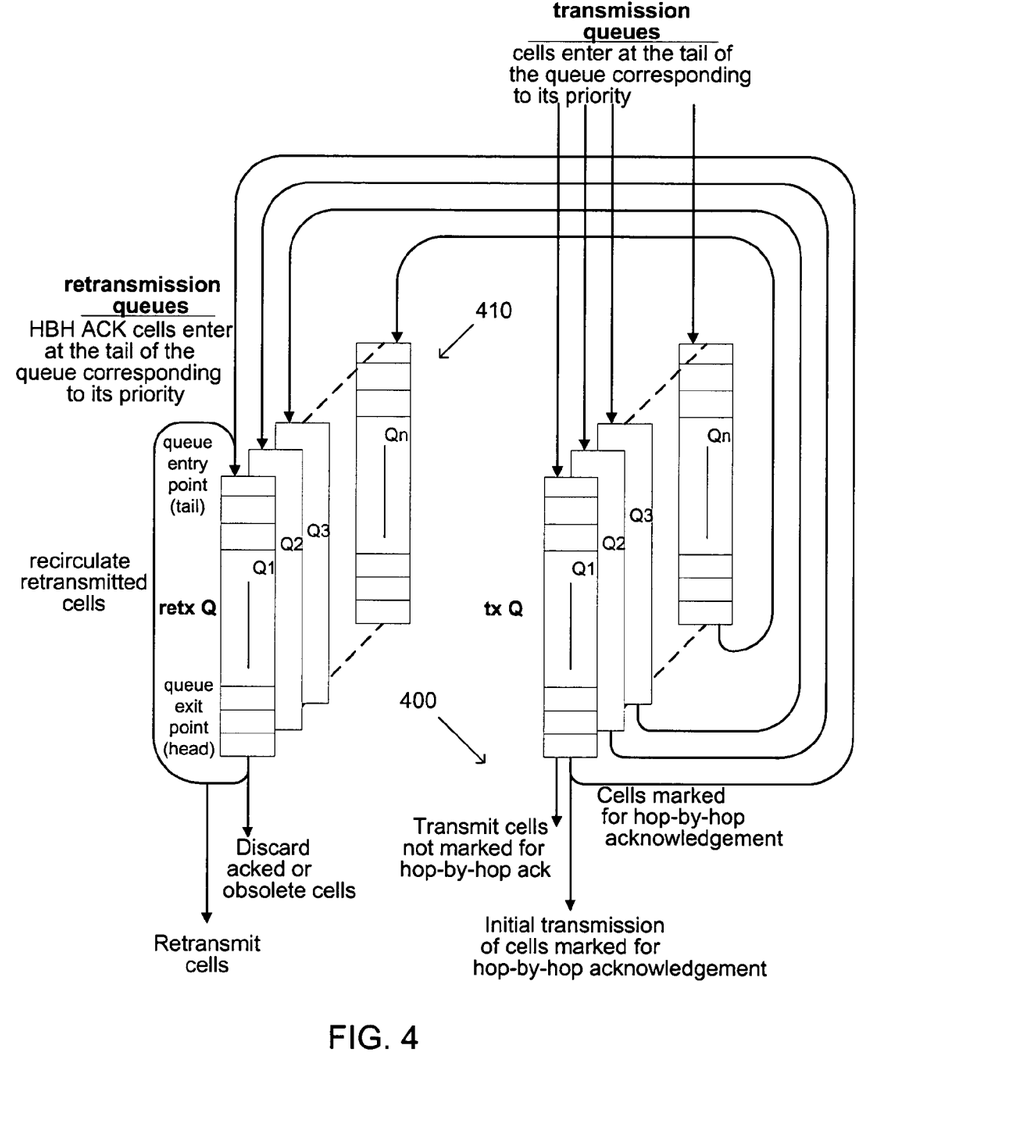
FIG. 4 is an exemplary depiction of a recirculating retransmission queue arrangement.

According to an exemplary embodiment, the processing begins when packets enter WNE 220 and are fragmented into cells. If a packet is marked for reliable delivery, the cells are marked for hop-by-hop acknowledgments (HBH ACK) and retransmissions as necessary. The cells are then placed in the priority queues (tx Q) 400 that Channel Access 370 pulls from when it builds packets for transmission. After a cell is placed in a transmission packet, if it is marked HBH ACK it is placed in one of the retx Qs 410 to await retransmission if necessary, as further described below.

As IP packets are injected into the WNE subnet, if their code points indicate that a reservation is necessary, reservation requests cause Soft Circuits 360 to build up a circuit of allocated slots along the path from source to destination. USAP manages the allocations on every link in a way that efficiently uses channel resources (TDMA slots and frequency channels) while taking into account the priority and latency requirements of individual reservation requests.

In addition to its is responsibility for reliably transmitting cells marked HBH ACK, Channel Access 370 gathers link utilization metrics used to report congestion. It counts cells that are transmitted in the unicast and broadcast allocated slots and compares this against the total capacity of each link. This yields a link utilization metric. It also monitors the fullness of the priority queues and the availability of digital signal processor (DSP) buffers so that this can be factored into the congestion reports. One additional factor used to measure congestion is the availability of unallocated slots as reported by USAP 360.

Route management 380 is responsible for disseminating the congestion information about routes to destination nodes. Because it is already propagating routing information, it is advantageous to piggyback the congestion reports onto this mechanism. The same rules may be used to update the routes to the congestion reports so that only current information is used about the best route from every source to every destination.

A fragmentation and reassembly module 390 plays a role in QoS for packets both entering and leaving the network. On entry, the route to the packet destination is checked for congestion. If extreme congestion is indicated, the packet may be discarded unless it is has a FLASH code point. In that case the packet may be allowed to enter the network but the reliable flag is set FALSE. The reason for this is that once a route is extremely congested, which is characterized by overflowing queues and cells being discarded, hop-by-hop retransmissions tend to make things worse. Meanwhile, Soft Circuits 360 tries to establish a highest priority circuit for the FLASH traffic stream, which will probably alleviate the congestion along the route of this stream and once again allow for reliable delivery.

While a packet is being reassembled, it must be queued up to allow for cells that arrive out of order. The cells arriving late are caused by the delays inherent in retransmissions. Once a packet is complete it is delivered without delay to minimize latency. This means that packets can be delivered out of order. An extra layer of queuing may be added to provide in-order, reduced jitter packet delivery for those applications not affected by latency.

Finally, Soft Circuits 360 and USAP 360 come into play when building a circuit requiring reduced latency. Soft Circuits 360 propagates the reduced latency requirement along each hop of the path from source to destination. USAP 360 deals with this requirement by assigning additional slots to the circuit and spreading the slots in the TDMA frame to reduce the time that cells must wait in the queues before a transmit opportunity arrives. These mechanisms can reduce the average latency by 100 ms and more over the course of a multihop route.

Applications that are not delay sensitive may benefit from increased delivery reliability, especially if it avoids a costly end-to-end retransmission. There is a cost though in terms of increased overhead, increased congestion, and reduced throughput for packets not marked for reliable delivery. It can also put a considerable strain on the processing and DSP memory capacity of the radios. Consider that cells marked HBH ACK must be held for up to several seconds to allow for retransmissions. This is in contrast to cells not marked HBH ACK that typically tie up their DSP memory buffers for less than 100 ms before they are transmitted. Also, consider that a record must be maintained at both the transmitter and receiver for each cell marked HBH ACK so that an acknowledgement can be generated to determine whether a retransmission is necessary. Fast lookup data structures may be employed and considerable processing expended to keep up with the real-time demands of this task.

FIG. 4 depicts first in first out (FIFO) transmission queues 400 used for both normal and HBH ACK cells. All cells initially enter the tx Q 400 corresponding to their priorities. Channel Access 370 pulls from the head of these queues 400 in order of priority when it builds packets for transmission. After being pulled from a tx Q 400, cells marked HBH ACK are reinserted in a retx Q 410. If a cell arrives at the head of retx Q 410 and a retransmission timeout has expired, it is pulled from the queue, inserted in the packet for retransmission, and the cell is reinserted at the tail. When a cell is acknowledged or it has exceeded its retransmissions, it is pulled from the queue and its DSP buffer is recovered.

This retransmission queuing scheme may be termed Recirculating Retransmission Queuing (RRQ). It minimizes the processing required to determine which cells are next eligible for retransmission or discard because they are always at the head of retx Q 410. Channel Access 370 gives priority to the retransmissions by pulling from the retx Qs 410 first before the tx Qs 400.

Figure 5:
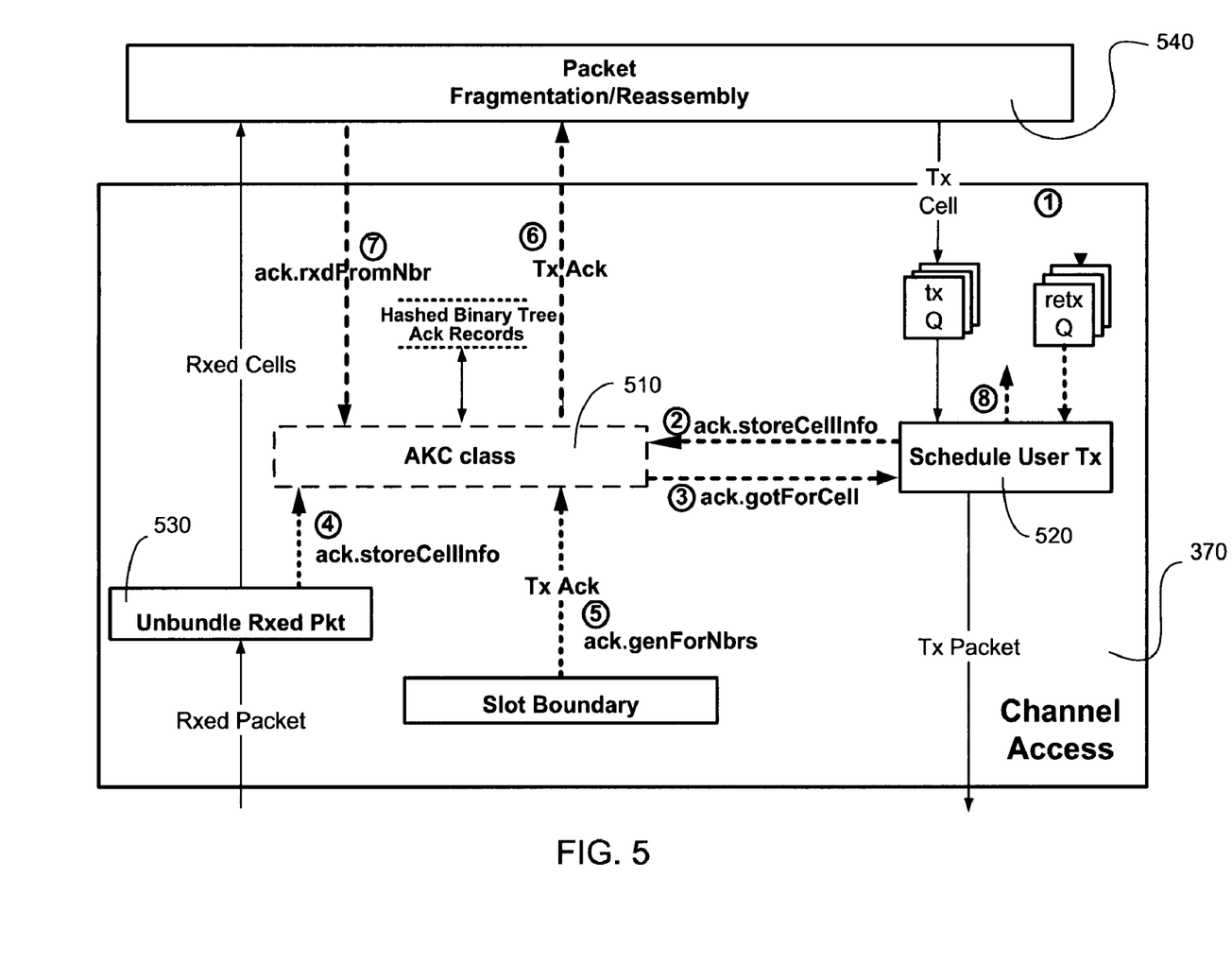
FIG. 5 is an exemplary depiction of the acknowledgement class processing.

FIG. 5 depicts the additional processing required to handle the acknowledgements and retransmissions. The heart of this process is the ACK class, an object that encapsulates much of the hop-by-hop reliability logic. To speed up the processing a data dictionary employing a hash table and binary trees is used to store and retrieve the ACK records. Both the transmitter and receiver use the same data dictionary by marking the individual packet records as either transmit or receive. The major events are as follows:

1. Schedule User Tx 520 takes a cell from the tx Q 400 marked HBH ACK, transmits it, and places it in the retx Q 410.
2. Schedule User Tx 510 calls the ACK class method storeCellInfo( ) to store cell information for event 1.
3. ScheduleUserTx 520 determines if a cell needs retransmission by querying the ACK class gotForCell( ) method.
4. Unbundle Rxed Pkt 530 calls the ACK class method storeCellInfo( ) to store information about a cell marked HBH ACK.
5. Slot Boundary generates an ack by calling the ACK class method genForNbrs( ).
6. The ack generated in event 5 is sent to a Packet Fragmentation/Reassembly 540 for transmission to all neighbors.
7. Packet Reassembly 540 calls the ACK class method rxdFromNbr( ) when an ack is received. The contents of the ack are stored in the ACK Class.
8. Schedule User Tx 520 determined if a cell needs retransmission in event 3. If so, it pulls the cell and reinserts it at the tail of the queue. If it is done retransmitting the cell it pulls it from the queue and releases the buffer.

In conventional retransmit queuing algorithms, cells that are not acknowledged within a time frame must be retransmitted out of the queue. Since the retransmit queue is a FIFO mechanism this may entail a linear search through the entire queue looking for cells that need to be retransmitted due to a timeout and then sending them out. This type of search consumes significant real time and degrades system performance.

An optimization to the queue can be done by implementing a recirculation mechanism. This means that a cell at the head of the queue is tested for its state indicating that it has either been acknowledged or not. If the cell has been acknowledged it is removed from the queue. However if the cell needs retransmission then a copy of the cell is made, placed at the tail of the queue, and the cell is retransmitted. The next entry is then promoted to the head of the queue and the process is repeated. This process continues until a cell is found that does not need to be retransmitted due to its timer value being below the retransmit threshold. At this point the search through the queue is discontinued because the recirculation mechanism has ensured that all subsequent queue entries are below the retransmit threshold. This may be a considerable improvement over leaving queue entries in their original place in the queue and searching the entire queue for entries requiring retransmission.

The RRQ solves a need to speed up transmission out of retransmit queue 410. Conventionally, the entire queue is searched linearly to find cells that are eligible for retransmission. This process, however, is time consuming. Cells that had already been retransmitted are left in the queue and these cells needed to be tested each time the retransmission queue was checked to transmit out of. In accordance with an exemplary embodiment, a solution is provided in that when a cell needed to be retransmitted is was pulled off the head of the queue and put back onto the tail.

Conventional retransmit systems look backward linearly in the retransmit Q for cells to retransmit and retransmitting if needed. The problem with conventional systems is that acknowledged or timed out cells may be left in place and marked as stale (needing to reclaim the memory resource) in the Q causing a linear search to test this entire Q entry by entry every time it tries to transmit from the retransmit Q. This process wastes time testing for stale cells and cells that have not timed out. This process interspersed hits (cells that might need to be retransmitted) with holes (cells not needing to be retransmitted because they have been acknowledged or timed out) during the search. These holes (stale cells that use computer memory) eventually worked their way to the head of the Q where the resources were reclaimed—note the memory resources are only reclaimed when they get to the front of the Q—a drawback of a simple FIFO Q. The recirculation idea is to pack cells that need retransmission at the front of the Q and put the cells needing retransmission in the back and not have holes. An advantage of this process is that no resources are left sitting around in the Q to be eventually reclaimed when they reach the head of the Q. There is no need to search the entire Q for cells to retransmit because all the cells to be retransmitted are at the front of the Q. After a cell is transmitted from the head of the Q, look at the next one and see if it is ready to be retransmitted. Basically all of the cells needing retransmission are now toward the front of the Q and they can all be retransmitted very quickly one after another. At some point during this retransmission and pulling cells off the front of the Q a point is found where one of the cells is new (not timed out so not ready for retransmission) and so all the other cells behind it in the queue are new—stop searching for cells to retransmit. This makes a simple FIFO Q very efficient for retransmission purposes because searching for cells to retransmit is made simple since they are all bunched together at the front of the Q and system memory is quickly reclaimed instead of sitting around in the Q and consuming valuable resources.

After all the appropriate cells have been sent out of the retransmission Q, look at the original transmit Q. This gives priority to the retransmission Q. In an exemplary embodiment, the following describes an exemplary RRQ process:

1. Examine the cell at the head of the ReTx queue and either
   a. pull it and release it if NO_ACK_INFO or GOT_ACK
   b. pull it, tx it, and reinsert it if TIME_TO_RETX
   c. drop out of loop if NO_ACK_YET This queue discipline minimizes the time spent searching the queue for cells to retx. The cells at the head of the queue are always the oldest and the ones to be retransmitted next. Once a cell has been reached that is too new to retransmit, there is no point in looking further.

A further consideration is how to deal with the buffer used to transmit the cell, which is normally released after transmission. If the cell needs to be retransmitted it cannot be released until the last time it is transmitted. Cells requiring retransmission are duplicated and a copy is stored in the retransmit queue. Also, until the last duplicated cell is released the parent buffer remains allocated. For a cell where an acknowledgement has been received or the timeout value has expired the acknowledgment record is removed from the ACK Class data base. When the gotForCell method of the ACK Class is invoked a return value of noAckInfo will cause the cell to be removed from the retransmit queue. At this point the DSP buffer containing the cell will be released.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing and communication devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of communicating a data packet comprised of a plurality of data cells, the method using a transmit queue and a retransmit queue, each of the transmit queue and the retransmit queue having a head and a tail, the method comprising:

transmitting a first data cell from the head of the transmit queue;
   inserting the first data cell at the tail of the retransmit queue—in response to a hop-by-hop ACK signal—if the first data cell is for retransmission;
   removing a second data cell at the head of the retransmit queue if receipt has been acknowledged for the second data cell; and
   retransmitting the second data cell at the head of the retransmit queue if time to retransmit elapses, wherein the second data cell is provided to the tail of the retransmit queue if retransmitted.

2. The method of claim 1, further comprising:
   marking the first data cell as requiring a hop-by-hop receive acknowledgement.

3. The method of claim 1, further comprising:
   determining if the second data cell has timed out.

4. The method of claim 1, further comprising:
   determining if the second data cell has exceeded its predetermined number of retransmissions.

5. The method of claim 1, further comprising:
   removing the second data cell at the head of the retransmit queue in response to a No-Ack-Info for the second data cell.

6. The method of claim 1, further comprising:
   removing the second data cell at the head of the retransmit queue if it has exceeded its predetermined number of retransmissions or it has timed out.

7. The method of claim 1, wherein the method is performed in an ad hoc military radio network.

8. In communications system having a transmission reliability subsystem, the reliability subsystem comprising:
   a transmit queue having a head and a tail;
   a retransmit queue having a head and a tail;
   a means for transmitting a first data cell from the head of the transmit queue;
   a means for inserting the first data cell at the tail of the retransmit queue in response to a HBH ACK signal; and
   a means for removing a second data cell at the head of the retransmit queue if receipt is acknowledged and for retransmitting the second data cell at the head of the retransmit queue if a time to retransmit occurs, wherein the second data cell is provided to the tail of the retransmit queue after retransmitting.

9. The subsystem of claim 8, further comprising:
   a means for marking the first data cell as requiring receive acknowledgement.

10. The subsystem of claim 8, further comprising:
    a means for determining if the second data cell has timed out.

11. The subsystem of claim 8, further comprising:
    a means for determining if the second data cell has exceeded its predetermined number of retransmissions.

12. The subsystem of claim 8, further comprising:
    a means for reinserting the second data cell at the tail of the retransmit queue.

13. The subsystem Of claim 8, further comprising:
    a means for discarding the second data cell because it has exceeded its predetermined number of retransmissions or it has timed out.

14. The communications system of claim 8, wherein the system is part of an ad hoc radio network.

15. A communications system, comprising:
    a plurality of transceiver nodes configured to utilize a time division multiple access structure to communicate between the transceiver nodes; and the time division multiple access structure including a plurality of time slots, wherein the transceiver nodes are configured to communicate data cells during the time slots, the data cells being transmitted from a transmission queue and a retransmission queue, wherein cells transmitted from the transmission queue—in response to a hop-by-hop ACK signal—are selectively placed sequentially into the retransmission queue for later retransmission in response to the need for a retransmission, wherein the retransmission queue includes a head and a tail wherein a first data cell is removed from the head of the retransmission queue if receipt is acknowledged and the first data cell is retransmitted if a time to retransmit elapses, wherein the first data cell is provided to the tail of the retransmit queue if retransmitted.

16. The communications system of claim 15, wherein a first data cell is copied before being transmitted from the transmission queue and is placed in the tail of the retransmission queue if the first data cell has been marked for receive acknowledgement.

17. The communications system of claim 15, wherein the first data cell at the head of the retransmission queue is discarded if timed out.

18. The communications system of claim 15, wherein the first data cell at the head of the retransmission queue is removed if the predetermined number of retransmissions has been received.

19. The communications system of claim 15, wherein the first cell at the head of the retransmission queue is copied, retransmitted and placed at the tail of the retransmission queue.

20. The communications system of claim 15, wherein the plurality of cells form a packet.

* * * * *